US009262701B2

(12) United States Patent
Shoda et al.

(10) Patent No.: US 9,262,701 B2
(45) Date of Patent: Feb. 16, 2016

(54) IMAGE PROCESSING APPARATUS AND METHOD FOR OPERATING THE SAME

(71) Applicants: KABUSHIKI KAISHA TOSHIBA, Tokyo (JP); TOSHIBA TEC KABUSHIKI KAISHA, Tokyo (JP)

(72) Inventors: Hirokazu Shoda, Kanagawa (JP); Yusuke Hashizume, Chiba (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/047,320

(22) Filed: Oct. 7, 2013

(65) Prior Publication Data

US 2015/0098097 A1    Apr. 9, 2015

(51) Int. Cl.
    *H04N 1/40*       (2006.01)
    *G06K 15/02*      (2006.01)
    *G06K 15/16*      (2006.01)
    *H04N 1/00*       (2006.01)
    *H04N 1/38*       (2006.01)

(52) U.S. Cl.
    CPC ............ *G06K 15/1806* (2013.01); *G06K 15/16* (2013.01); *H04N 1/00* (2013.01); *H04N 1/00633* (2013.01); *H04N 1/38* (2013.01)

(58) Field of Classification Search
    CPC .................. B41M 2205/18; H04N 2201/0094; H04N 2201/3222; H04N 2201/3274; H04N 1/2392; H04N 1/32133; H04N 2201/3226; H04N 2201/3269; H04N 1/00832; H04N 2201/0082; H04N 1/00477; H04N 1/2323; H04N 2201/3205; H04N 2201/3242; H04N 2201/3243; H04N 2201/3246
    USPC ............ 358/2.1, 1.9, 468, 400, 500; 347/179, 347/101
    See application file for complete search history.

(56) References Cited

U.S. PATENT DOCUMENTS

| | | | |
|---|---|---|---|
| 5,217,255 A * | 6/1993 | Lin et al. ...................... 281/15.1 |
| 8,177,347 B2 * | 5/2012 | Brewington et al. ......... 347/101 |
| 8,405,696 B2 * | 3/2013 | Yahata et al. ................. 347/179 |
| 8,760,480 B1 * | 6/2014 | Kubo ............................ 347/179 |
| 2010/0272449 A1 * | 10/2010 | Yoshida et al. .................... 399/2 |
| 2012/0148327 A1 * | 6/2012 | Taki et al. ..................... 400/695 |
| 2012/0306982 A1 | 12/2012 | Taki et al. |
| 2014/0093293 A1 * | 4/2014 | Yamaguchi et al. .......... 399/341 |

\* cited by examiner

*Primary Examiner* — Thomas D Lee
*Assistant Examiner* — Stephen M Brinich
(74) *Attorney, Agent, or Firm* — Patterson & Sheridan, LLP (57) ABSTRACT

An image processing apparatus includes a reading unit configured to read an image formed on a sheet, an erasing unit configured to erase the image formed on the sheet, and a controller configured to determine whether or not the image on the sheet as read by the reading unit is formed of an erasable material and prevent the sheet that is determined to have an image formed of the non-erasable material from being conveyed to the erasing unit.

18 Claims, 6 Drawing Sheets

IMAGE PROCESSING APPARATUS AND METHOD FOR OPERATING THE SAME

FIELD

Embodiments described herein relate to an image processing apparatus.

BACKGROUND

Conventionally, there is an image forming apparatus such as an MFP (Multi Function Peripheral) that forms an image on a sheet. Further, there is an erasing apparatus that can erase an image formed on a sheet with an erasable coloring agent such as a toner or ink containing leuco dye so that the sheet can be reused.

An erasable coloring agent can be decolorized when heated to a sufficiently high temperature (e.g. about 150 degrees centigrade). This temperature should be higher than a temperature to fix an image with the erasing color agent on a sheet. The aforementioned erasing of the image formed on the sheet may be hereinafter referred to as 'color erasing'. Reuse of sheets after color erasing saves sheets and is beneficial to the environment.

However, a sheet printed with a conventional non-erasable toner may be mistakenly set in the erasing apparatus. When such a sheet is supplied to the erasing apparatus, the sheet may be jammed, when erasing is attempted, due to the conventional non-erasable toner being melted and the sheet being adhered to a press roller or other heat source, or a sheet peeling claw, of the erasing apparatus.

DETAILED DESCRIPTION

In accordance with embodiments, an image erasing apparatus includes an image processing apparatus includes a reading unit configured to read an image formed on a sheet, an erasing unit configured to erase the image formed on the sheet, and a controller configured to determine whether or not the image on the sheet as read by the reading unit is formed of an erasable material and prevent the sheet that is determined to have an image formed of the non-erasable material from being conveyed to the erasing unit.

Embodiments of the present invention are described below in detail with reference to accompanying drawings, in each of which the same reference sign denotes the same unit.

Figure 1:
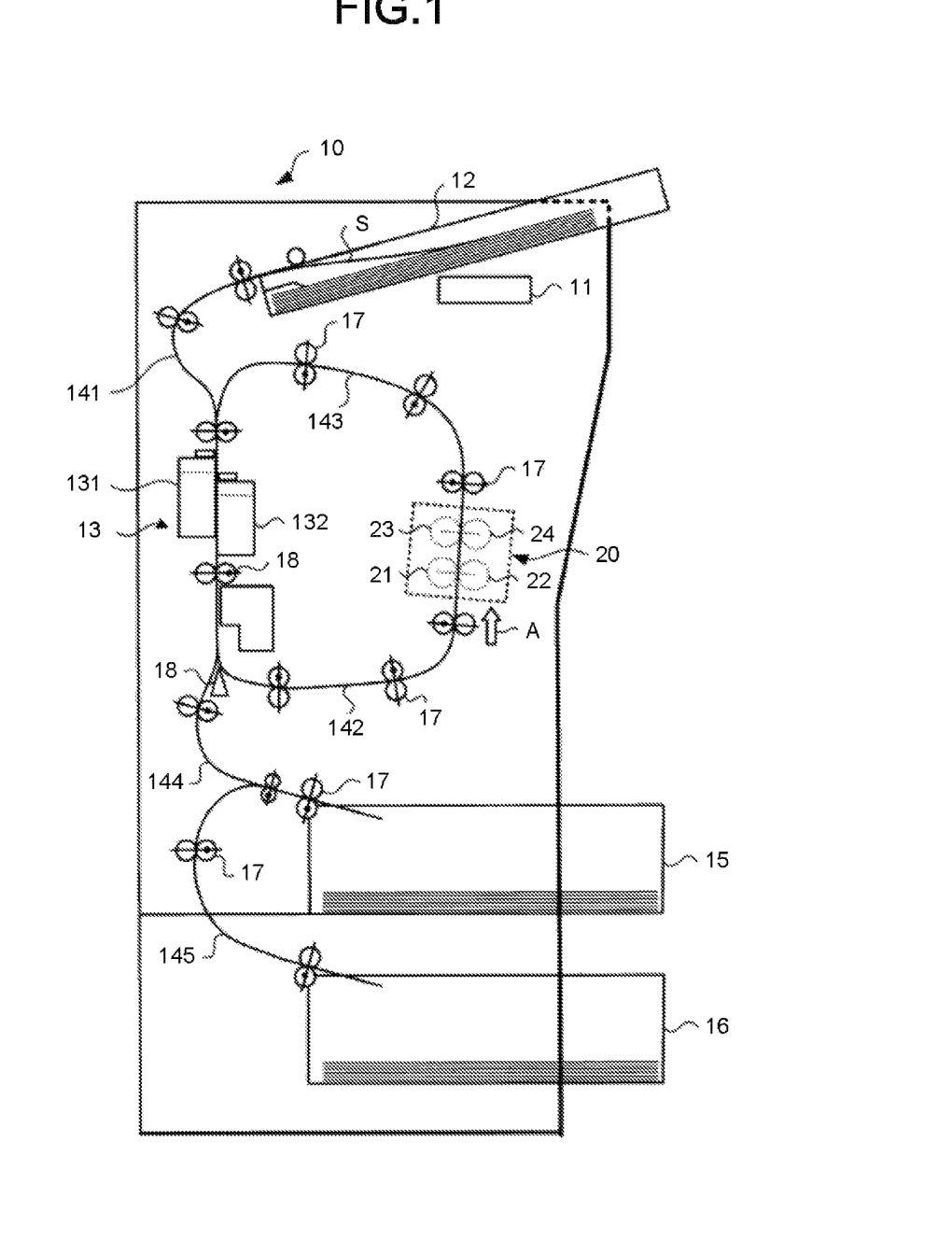
FIG. 1 illustrates a specific configuration of an image erasing apparatus according to an embodiment.

FIG. 1 illustrates an image processing apparatus (hereinafter referred to as an erasing apparatus) according to an embodiment. An erasing apparatus 10 comprises an operation panel 11 having operation buttons and a display, a sheet feeding section 12, and a scanner 13 serving as a reading section. The erasing apparatus 10 further comprises a first to a fifth conveyance paths 141-145, a first sheet discharging cassette 15, and a second sheet discharging cassette 16.

To convey a sheet, a plurality of motor-driven conveyance rollers 17 are disposed along each of the conveyance paths 141-145. Further, agate 18 is disposed to guide sheets towards either the conveyance path 142 or the conveyance path 144. Furthermore, an erasing section 20 is disposed along the conveyance path 142.

Through the first conveyance path 141, a sheet S is conveyed from the sheet feeding section 12 to the scanner 13. Through the second conveyance path 142, the sheet S is conveyed from the scanner 13 to the erasing section 20 along a direction indicated by an arrow A in FIG. 1. Through the third conveyance path 143, the sheet S is conveyed from the erasing section 20 to the scanner 13. Through the fourth conveyance path 144, the sheet S is conveyed from the scanner 13 to the first sheet discharging cassette 15. Through the fifth conveyance path 145, the sheet S is conveyed from the scanner 13 to the second sheet discharging cassette 16.

The first sheet discharging cassette 15 may be, for example, a cassette (reuse cassette) for storing a reusable sheet after an image erasing processing is carried out on the sheet. The second paper discharging cassette 16 is a cassette (reject cassette) for storing a sheet (a not-reusable sheet) which is hardly reusable and recycled. In the following description, the first sheet discharging cassette 15 is referred to as a reuse cassette 15 and the second sheet discharging cassette 16 is referred to as a reject cassette 16.

The erasing apparatus 10 shown in FIG. 1 substantially carries out the following erasing processing. First, a color erasing mode and a reading mode is selected for a sheet S at the operation section 11. Then, the sheet S is conveyed from the sheet feeding section 12 to the scanner 13 serving as a reading section via the first conveyance path 141. The scanner 13 includes a first scanner 131 and a second scanner 132 to read two sides of the sheet S. The scanner 13 scans an image formed on the sheet S and reads out image data corresponding to the image before the image is erased. In addition, the scanner 13 reads out a toner coverage rate and a printing condition of the sheet S.

A state of the sheet S is read out according to the printing condition read out by the scanner 13, and the sheet S is determined to be not reusable if there is deformation or damage such as a rip or a crumple on the sheet. The sheet which is determined to be not reusable is conveyed to the reject cassette 16 via the fifth conveyance path 145. Further, a sheet of a high toner coverage rate, which is likely to curl during erasing processing, is determined to be not reusable and is conveyed to the reject cassette 16. Further, a color of the image printed on the sheet S is determined, and a sheet printed using coloring agents other than an erasable coloring agent is also conveyed to the reject cassette 16. The erasable coloring agent includes an erasable toner and erasable ink; however, the formation of an image with an erasable toner is described as an example in the following description.

Moreover, a sheet S which has no rip or crumple and is printed with the erasable toner is conveyed to the erasing section 20 via the second conveyance path 142. The erasing section 20 comprises a first erasing section provided with a heat roller (heat source) 21 and a press roller 22 and a second erasing section provided with a press roller 23 and a heat roller (heat source) 24, and a sheet S is conveyed and heated between the heat roller 21 and the press roller 22 and between the press roller 23 and the heat roller 24. Heat sources are disposed inside the heat rollers 21 and 24, respectively. Temperature detecting sections are disposed at a periphery of the heat rollers 21 and 24, respectively. The heat source may be a lamp.

The sheet S conveyed to the erasing section 20 is heated while passing through the erasing section 20 to erase the image formed thereon by heating. The erasing section 20 erases the image formed on the sheet S by heating and pressurizing the sheet S at a temperature (e.g. at about 150-200 degrees centigrade) higher than a temperature at which the image is formed. That is, an erasable toner, the color of which will be erased at a given temperature, is used in the formation of an image on the sheet S. Thus, the color of the sheet S can be erased by conveying the sheet S at a preset conveyance speed to the erasing section 20 which heats the sheet S at the given temperature.

The sheet S passing through the erasing section 20 is conveyed to the scanner 13 again via the third conveyance path 143. The scanner 13 reads the printing condition again to determine whether or not the image formed with the erasable toner is successfully erased and sort out the sheets S.

The sheet S which is determined to be reusable since the image thereon is determined to be erased according to a new reading result of the scanner 13 is conveyed to the reuse cassette 15 via the fourth conveyance path 144 as a reusable sheet. Further, the sheet which is determined to be not reusable since the sheet is determined to be ripped or crumpled, or include a residual image formed with a non-erasable coloring agent or a hand-drawn image left in an image area of the sheet according to the printing condition read out by the scanner 13 is conveyed to the reject cassette 16 via the fifth conveyance path 145.

Figure 2:
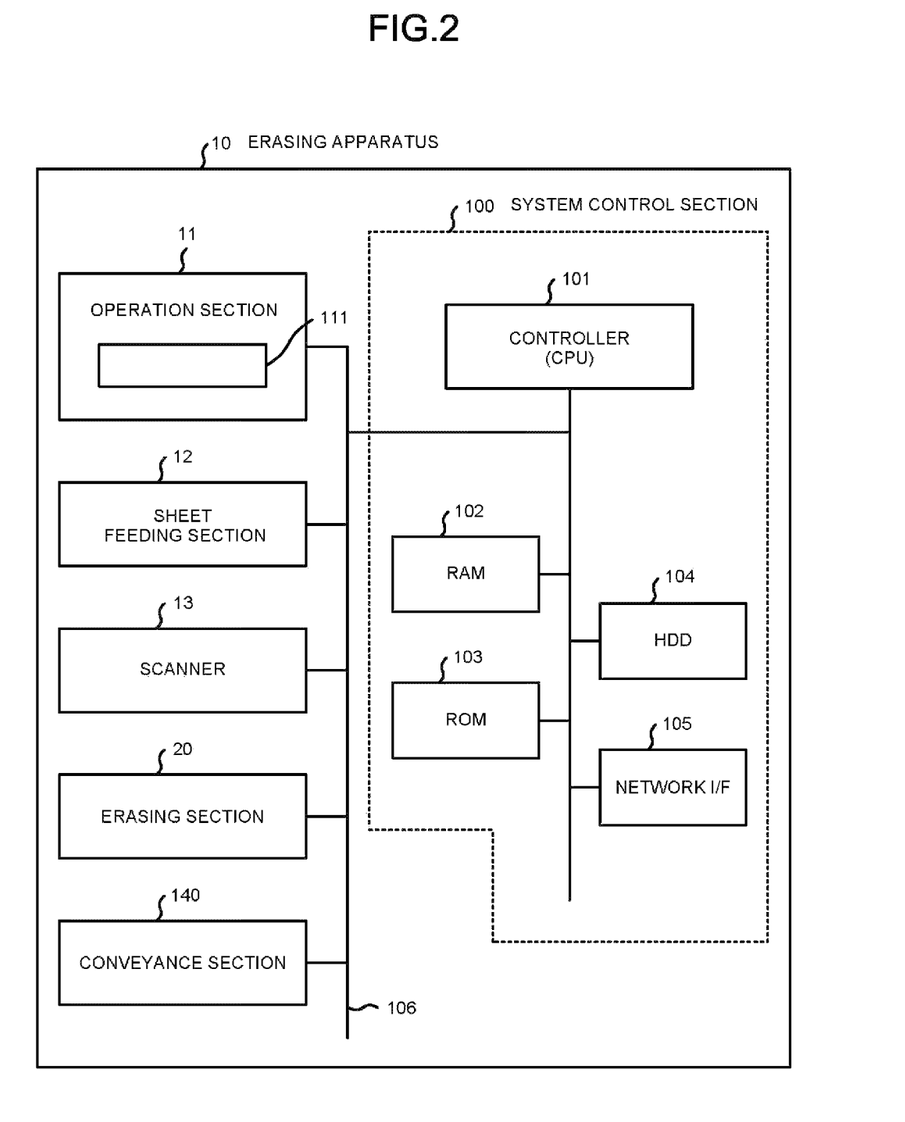
FIG. 2 is a block diagram illustrating a control system of the erasing apparatus according to the embodiment.

FIG. 2 is a block diagram illustrating a control system of the erasing apparatus 10. The erasing apparatus 10 comprises a system control section 100 for uniformly controlling each section. The system control section 100 comprises a CPU 101 serving as a controller, a RAM (random access memory) 102, a ROM (read only memory) 103, an HDD (hard disk drive) 104, a network interface (I/F) 105, and the like.

Further, the operation panel 11, the sheet feeding section 12, the scanner 13, the erasing section 20, and the conveyance section 140 are connected with the system control section 100 via a bus line 106. The operation section 11 comprises a display 111, and the conveyance section 140 comprises a motor (not shown) for rotating the plurality of conveyance rollers 17 disposed along each of the conveyance paths 141-145.

The CPU 101 performs various processing functions by executing the control program stored in the ROM 103. The RAM 102 is a main memory functioning as a working memory. The ROM 103 stores the control program and control data for controlling operations of the erasing apparatus 10 and performing various processing functions. For example, the ROM 103 stores reference information for determining whether or not a sheet is reusable, hue angle information for color determination, setting temperature information of the erasing section 20, and the like.

The HDD 104 is a high-capacity data storage memory capable of storing various kinds of information, for example, the image data read out by the scanner 13. The network interface (I/F) 105 is an interface for communicating with an image forming apparatus or another external apparatus (e.g. PC) via a local area network.

Figure 3:
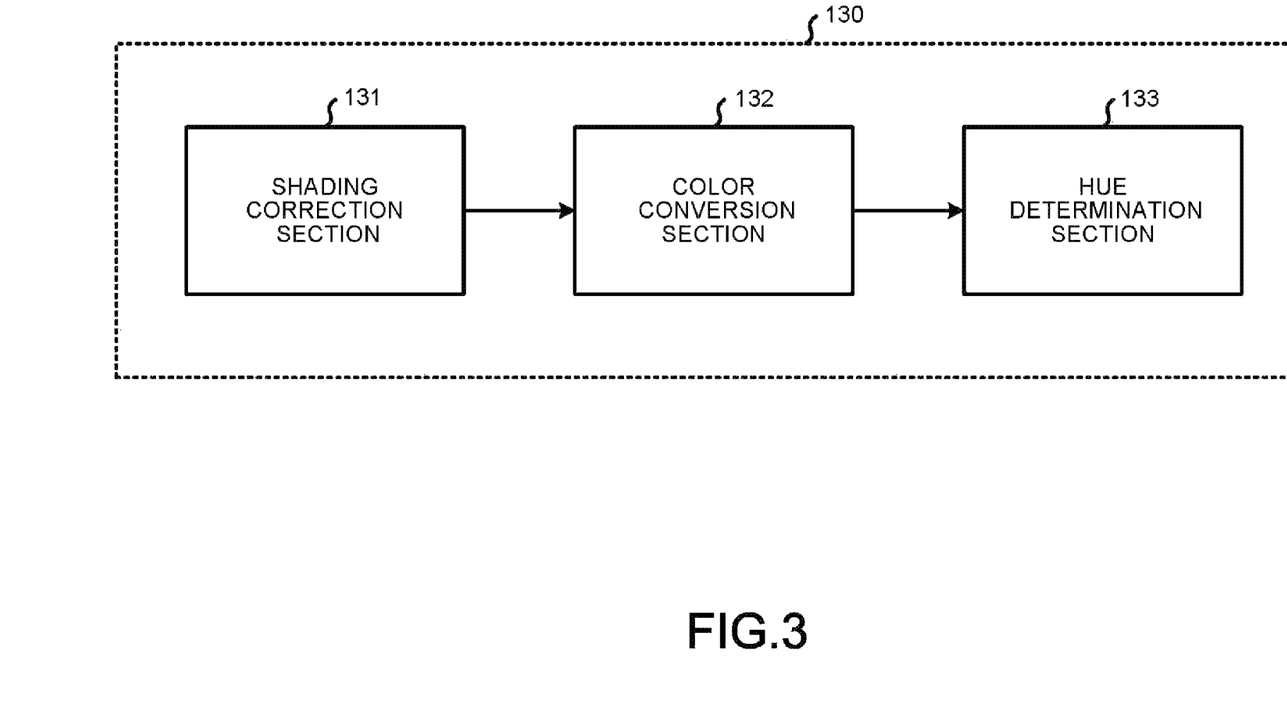
FIG. 3 is a block diagram schematizing a determination section of a CPU according to the embodiment.

FIG. 3 is a diagram schematizing a determination section of the CPU 101 of the erasing apparatus 10. The determination section may be included in a device different from the CPU 101, for example, an ASIC (Application Specified IC).

Hereinafter, the determination section is referred to as a determination section 130. The determination section 130 comprises a shading correction section 131, a color conversion section 132, and a hue determination section 133, which are connected with the scanner 13.

The scanner 13 comprises a CCD line sensor for reading an image to generate an RGB signal. The shading correction section 131 corrects a deviation caused by a sensitivity unevenness of the CCD or an unevenness of a light source in a density and a color of an image. The color conversion section 132 converts the image data (the RGB signal) subjected to the shading correction to, for example, an Lab signal which defines a color by brightness, hue, and saturation. The Lab scale is a scale for defining a standardized color determined by the CIE (Commission Internationale de l'Éclairage), and a color can be defined more precisely by the Lab scale.

Figure 4:
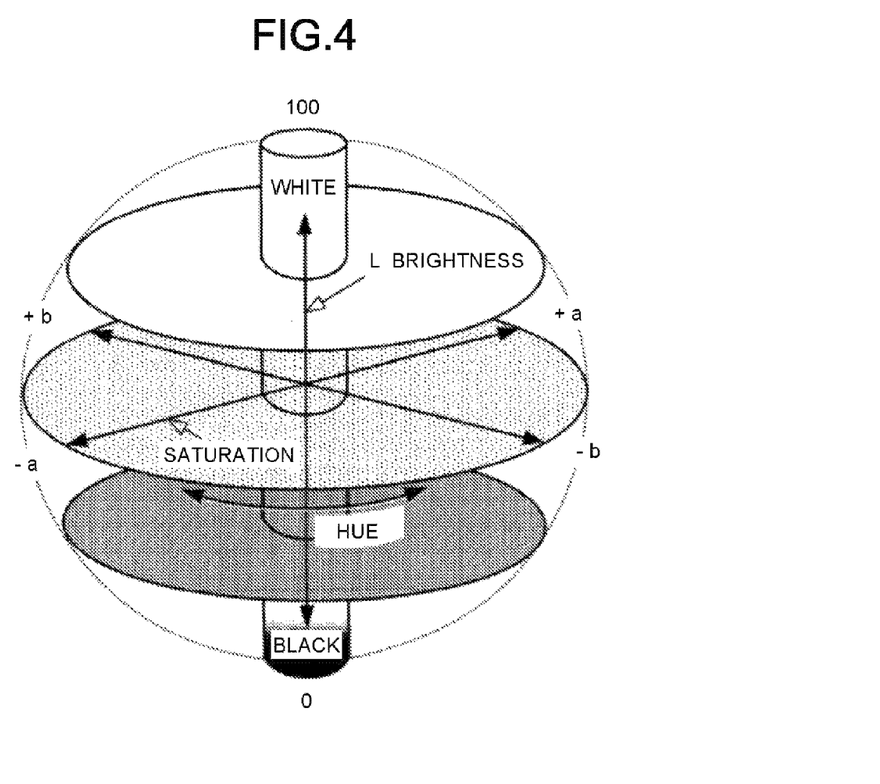
FIG. 4 schematically illustrates a color model of Lab according to the embodiment.

FIG. 4 schematically illustrates a color model of the Lab scale. As shown in FIG. 4, in the Lab scale, a color can be defined by three parameters of 'brightness L' (an axis in a vertical direction of FIG. 4) representing a brightness of the color, 'saturation' representing a vividness of the color based on a distance from the brightness axis, and 'hue' representing a color space. Hue and saturation are represented by "a" and "b." "a" is an axis representing colors from red to green, "b" is an axis representing colors from yellow to blue, and the saturation increases as the distance from the brightness axis L (the center) to a point of the color increases. The value of the brightness L is in a range from 0-100, 0 representing black color and 100 representing white color. Further, values of "a" and "b" are in a range from −128 to 128.

The hue determination section 133 determines the color of the image (character, graph) printed on the sheet and calculates a hue angle θ for the Lab signal converted by the color conversion section 132 using the signals "a" and "b." The hue angle is calculated using the following formula (1):

(Formula 1)

★

$$\theta = \tan^{-1}(b/a) \times 180/\pi \tag{1}$$

Figure 5:
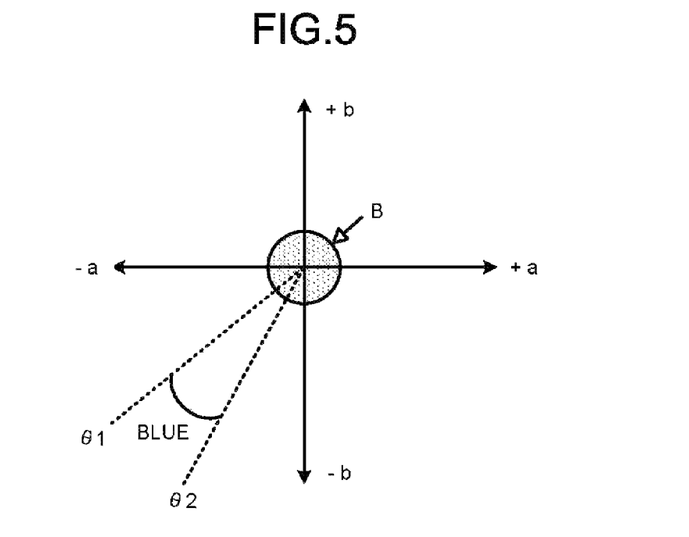
FIG. 5 illustrates a hue angle of Lab according to the embodiment.

FIG. 5 illustrates the hue angle in the color space of "a" and "b." The hue angle is calculated using signals "a" and "b," and as shown in FIG. 5, if the hue angle is in the range from θ1 to θ2, then it can be determined that the color is blue. However, a background of a sheet on which no toner is formed (hereinafter referred to as a ground part) should be excluded from a pixel to determine a type of the toner.

For example, in the determination of a blue color, if the value of L is above 80, then it can be determined that the part is a ground part even if the hue angle is in the range from θ1 to θ2. Further, if "a" and "b" are both in a range from −10 to 10 (a range represented by a circle B shown in FIG. 5), then it can be determined that the color is black or gray even if the hue angle is in the range from θ1 to θ2. Otherwise, if the hue angle is in the range from θ1 to θ2, then it can be determined that the color is blue (erasable toner). Then, pixels that are determined to have blue color and pixels that are determined to have other colors are counted respectively.

Generally, the erasable toner is blue. On the other hand, cyan, magenta, yellow, and black toners are used in ordinary color copiers, and a monochrome toner is used in a monochrome copier. In the present embodiment, the erasable toner is a single blue color, and whether an image is formed with an erasable toner or a non-erasable toner is determined by determining the color of the toner formed on the sheet.

Based on the result of the determination, only the sheet S (a first sheet) printed with an erasable toner is conveyed to the erasing section 20 to erase the image on the sheet. Moreover, the sheet S (a second sheet) printed with a conventional non-erasable toner is not conveyed to the erasing section 20 but conveyed to the reject cassette 16 via the fifth conveyance path 145.

Since the sheet S printed with the conventional non-erasable toner is not conveyed to the erasing section 20, the toner is prevented from being melted by the heat generated by the erasing section 20. Thereby, the problem of sheet jam caused by the adhesion of the toner on the press rollers 22, 23, the heat rollers 21 and 24 or the sheet peeling claw can be avoided.

Next, an operation of erasing the image on a sheet S and conveying the sheet S that are carried out in the erasing apparatus 10 according to the embodiment is described.

Figure 6:
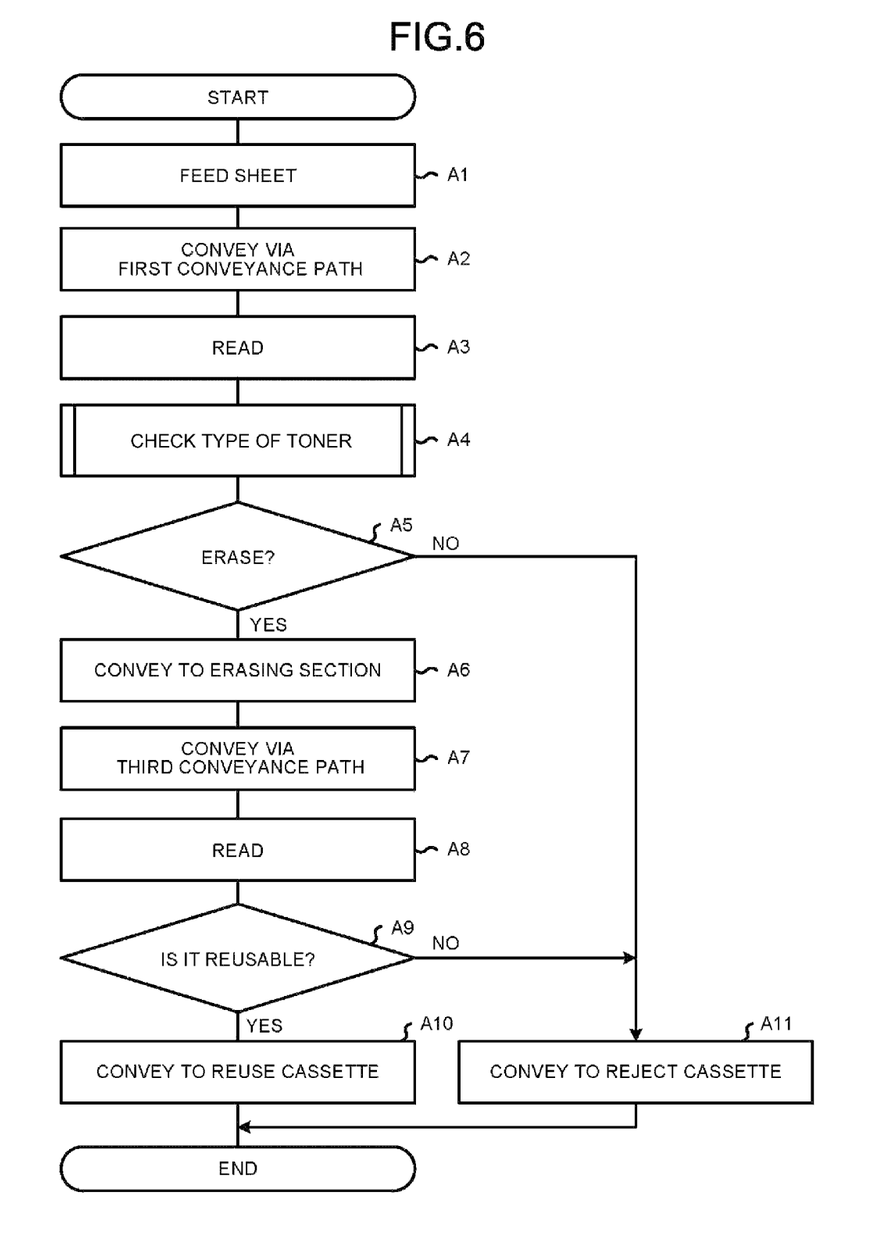
FIG. 6 is a flowchart illustrating an operation of the image processing apparatus according to the embodiment.

FIG. 6 is a flowchart illustrating the operation of erasing the image on a sheet S and conveying the sheet S that are carried out under the control of the CPU 101.

In ACT A1 shown in FIG. 6, the CPU 101 instructs the sheet feeding section 12 to feed a sheet S. In ACT A2, the CPU 101 instructs the conveyance rollers 17 along the first conveyance path 141 to rotate and cause the sheet S to be conveyed the scanner 13. In ACT A3, the CPU 101 instructs the scanner 13 to read the sheet S, and in ACT A3, whether or not there is a rip or crumple is checked. The check is carried out because a ripped or crumpled sheet is not reusable. Next, in ACT A4, the CPU 101 checks a type of the toner fixed on the sheet S. That is, the CPU 101 executes the determination processing of the hue angle described in FIG. 5.

In ACT A5, the CPU 101 determines whether or not carrying out an erasing processing on the image on the sheet S based on the result of ACT A3 or ACT A4. For example, the erasing processing is not carried out if the sheet is ripped or crumpled according to the result of ACT A3. Moreover, the erasing processing is not carried out if the image is determined to be printed with an non-erasable toner according to ACT A4. If it is determined that the erasing processing is not to be carried out, that is, the result of the determination of ACT A6 is No, the CPU 101 proceeds to ACT A11 to instruct the conveyance section 140 to convey the sheet S to the reject cassette 16.

On the other hand, if it is determined that the sheet S is not ripped or crumpled and the image on the sheet is printed with the erasable toner, that is, the result of the determination of ACT A5 is Yes, the CPU 101 sends an instruction of conveying the sheet S to the erasing section 20 via the second conveyance path 142 in ACT A6. The erasing processing is carried out on the image on the sheet S conveyed to the erasing section 20. After the erasing processing is finished, the CPU 101 sends an instruction of conveying the sheet S to the scanner 13 again via the third conveyance path 143 in ACT A7. In ACT A8, the CPU 101 instructs the scanner 13 to scan the sheet S again. The CPU 101 determines whether or not the sheet S is reusable in ACT A9. That is, it is determined in ACT A9 whether or not the sheet S is ripped or crumpled.

If the sheet, which is not ripped or crumpled and the image on which is erased, is determined to be reusable in ACT A9, that is, the result of ACT A9 is Yes, the CPU 101 instructs the conveyance section 140 to convey the sheet S to the reuse cassette 15 via the fourth conveyance path 144 in ACT A10. Further, the sheet, which is ripped or crumpled, is determined to be not reusable, thus, the CPU 101 instructs the conveyance section 140 to convey the sheet S to the reject cassette 16 via the fifth conveyance path 145 in ACT A11. As the conveyance section 140 is instructed to convey the sheet S, on which a residual image may exist, to the reject cassette 16 but not to the erasing section 20 in ACT A5, there is no sheet having a residual image processed in the determination of ACT A9.

Figure 7:
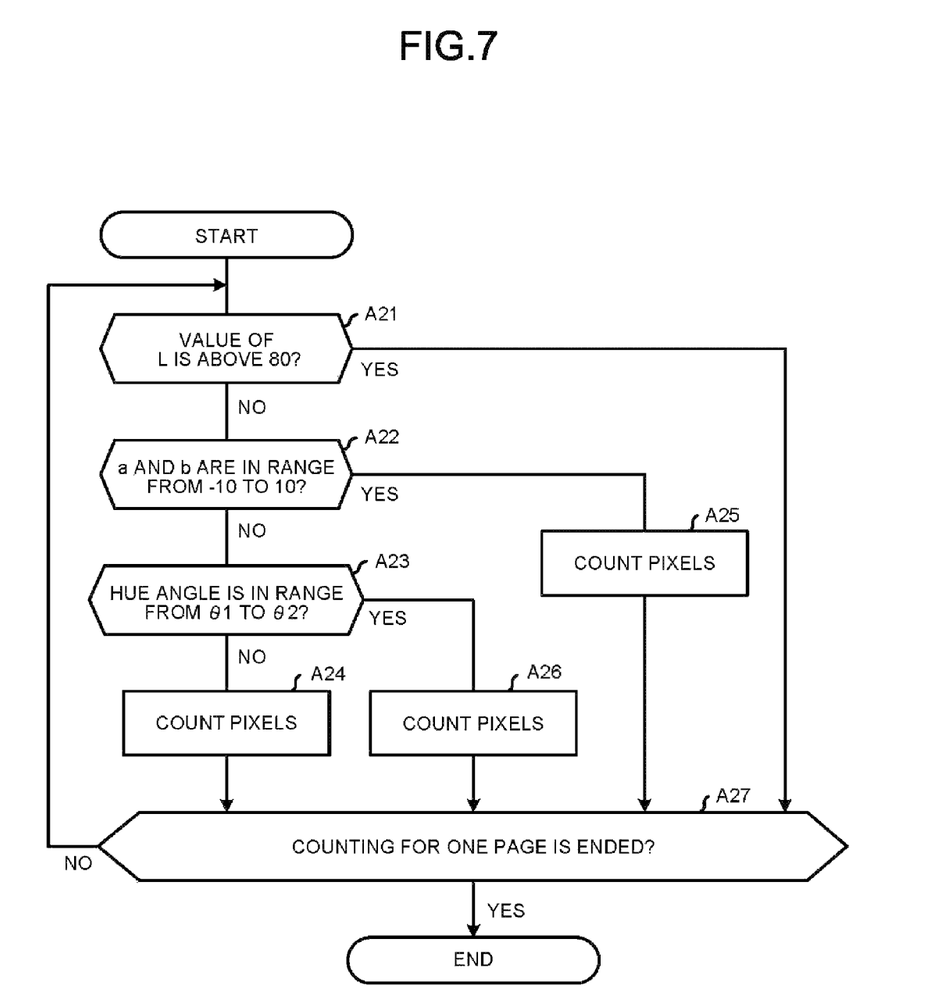
FIG. 7 is a flowchart illustrating a color determination operation carried out in the image processing apparatus according to the embodiment.

FIG. 7 is a flowchart illustrating a color determination operation of determining whether or not the erasing operation is to be carried out on the image on a sheet in ACT A4 shown in FIG. 6.

When a sheet is fed from the sheet feeding section 12, the scanner 13 scans the sheet S, generates a plurality of RGB signals, each corresponding to one of the pixel of the sensor, and sends the RGB signals to the CPU 101. Each of the RGB signals is sent by the CPU 101 to the color conversion section 132 via the shading correction section 131, and the color conversion section 132 converts the image data (each of the RGB signals) subjected to a shading correction to a signal of Lab.

The hue determination section 133 calculates a hue angle θ using signals "a" and "b" based on the converted signal of Lab. The hue angle θ is calculated using the formula (1). The hue angle is calculated, and as shown in FIG. 5, if the hue angle is in the range from θ1 to θ2, then it can be determined that the color of the image corresponding to the pixel is blue. Hereinafter, the hue determination section 133 cooperates with the CPU 101 to carry out a color determination.

That is, it is necessary that a ground part of a sheet on which no toner is formed be excluded from a pixel to determine a type of the toner.

Thus, the CPU 101 determines whether or not the value of the L is above 80 in ACT A21. If the value of the L is above 80, that is, the result of the determination of ACT A21 is Yes, then the CPU 101 determines that the pixel corresponds to a ground part and then the flow proceeds to ACT A27. Further, if the value of the L is less than 80, that is, the result of the determination of ACT A21 is No, the flow proceeds to ACT A22.

In ACT A22, the CPU 101 determines whether or not "a" and "b" are both in the range from −10 to 10 based on values of "a" and "b." If "a" and "b" are both in the range from −10 to 10, that is, the result of the determination of ACT A22 is Yes, then the CPU 101 determines that the color of an image part corresponding to the pixel is black or gray and then the flow proceeds to ACT A25 to count up the number of pixels corresponding to black or gray image parts. Further, if it is determined in ACT A22 that values of "a" and "b" are not in the range from −10 to 10, that is, the result of the determination of ACT A22 is No, the CPU 101 determines the hue angle in ACT A23. In ACT A23, if the hue angle is in the range from θ1 to θ2, then the CPU 101 determines that the color of the pixel is blue (printed with an erasable toner) and counts up the number of pixels corresponding to blue image parts in ACT A26.

In ACT A23, if the hue angle is not in the range from θ1 to θ2, that is, the result of the determination of ACT A23 is No, then it is determined that the color of the image part corresponding to the pixel is a color different from blue, and pixels corresponding to colors other than blue are counted up in ACT A24.

In ACT A27, that whether or not the counting for pixels of one page is ended is determined based on the counting result of ACTs A24, A25 and A26. If the counting for one page is not ended, the flow returns to ACT A21 to repeat the same operation. If the counting for one page is ended, then the processing is ended.

Further, in ACTs A24 and A25, a threshold value (Th1) is set in advance, and if the counted value is above Th1, then the read sheet is discharged to the reject cassette 16 without the erasing processing being carried out. Further, a threshold value (Th2) is set in advance in ACT A26. If the values counted in ACTs A24 and A25 are smaller than Th1 and the value counted in ACT A26 is greater than Th2 pixel, then the sheet is conveyed to the erasing section 20 via the second conveyance path 142 as a sheet to be erased and then erased.

By setting the threshold values Th1 and Th2, a tiny residual image or a tiny image formed with an erasable toner can be ignored.

Further, the hue angles θ1 and θ2 used in the determination are determined in combination with the color of an erasable toner, the threshold values Th1 and Th2 are determined according to the toner coverage rate of the image printed on the sheet, for example, the threshold values Th1 and Th2 are increased when the toner coverage rate is high and decreased when the toner coverage rate is low.

As stated above, it is determined whether or not a sheet is an erasable sheet when reading the image on the sheet, thereby only the sheet printed with the erasable toner is conveyed to the erasing section, which prevents a sheet printed with a conventional toner from being conveyed to the erasing section and adhesion of the toner at the erasing section.

Further, an example of the Lab conversion carried out by the color conversion section 130 to determine whether or not a sheet is printed with the erasable toner is described in the present embodiment, however, it is not limited to the example shown in accompanying drawings, the determination may be made using RGB signals.

Further, the erasing apparatus 10 may be included in an image forming apparatus (e.g. an MFP). In this case, the image forming apparatus may be defined as an erasing apparatus. Further, the image forming apparatus can be defined as an apparatus for forming an image only with a material which can be melted by heating.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
a reading unit configured to read an image formed on a sheet;
an erasing unit configured to erase the image formed on the sheet; and
a controller configured to determine whether or not the image on the sheet as read by the reading unit is formed of an erasable material and prevent the sheet that is determined to have an image formed of the non-erasable material from being conveyed to the erasing unit, wherein
the reading unit includes an image sensor formed of a plurality of pixels, the image sensor configured to generate a plurality of RGB signals corresponding to the image on the sheet, each of the RGB signals corresponding to one of the pixels, and
the controller is configured to convert each of the RGB signals to a Lab signal and determine whether or not the image on the sheet as read by the reading unit is formed of the erasable material based on the converted Lab signals.

2. The image processing apparatus according to claim 1, wherein
the controller is configured to cause the sheet that is determined to have an image formed of the erasable material to be conveyed to the erasing unit.

3. The image processing apparatus according to claim 1, further comprising:
a first storing unit; and
a second storing unit, wherein
the controller is configured to cause the sheet that is determined to have an image formed of the erasable material to be conveyed to the first storing unit after the sheet has passed the erasing unit, and cause the sheet that is determined to have the image formed of the non-erasable material to be conveyed to the second storing unit.

4. The image processing apparatus according to claim 1, wherein
the controller is configured to determine whether or not the image on the sheet as read by the reading unit is formed of the erasable material based on a color of the image.

5. The image processing apparatus according to claim 1, wherein
the controller is configured to determine whether or not a color indicated by the Lab signal is a predetermined color with respect to each of the pixels, and determine that the image on the sheet as read by the reading unit is formed of the erasable material if the number of pixels of which color are the predetermined color is equal to or more than a predetermined number.

6. The image processing apparatus according to claim 5, wherein
the controller is configured to determine that the image on the sheet as read by the reading unit is formed of the non-erasable material if the number of pixels of which color are not the predetermined color is equal to or more than a predetermined number.

7. The image processing apparatus according to claim 1, wherein
the erasing unit includes a heat source and a press roller that are configured to erase the image on the sheet while conveying the sheet therebetween.

8. A method for operating an image processing device, comprising:
generating a plurality of RGB signals corresponding to an image formed on a sheet using an image sensor, each of the RGB signals corresponding to one of a plurality of pixels of the image sensor;
converting each of the RGB signals to a Lab signal;
determining whether or not the image is formed of an erasable material based on the converted Lab signals;
conveying the sheet to an erasing unit of the image processing device when the sheet is determined to have an image formed of the erasable material; and
conveying the sheet that to a place that is different from the erasing unit when the sheet is determined to have an image formed of the non-erasable material.

9. The method according to claim 8, wherein the image processing device includes a first storing unit and a second storing unit, and
the sheet is conveyed to the second storing unit when the sheet is determined to have the image formed of the non-erasable material, and
the sheet is conveyed through the erasing unit to the first storing unit when the sheet is determined to have the image formed of the erasable material.

10. The method according to claim 8, wherein
whether or not the image on the sheet is formed of the erasable material is determined based on a color of the image.

11. The method according to claim 10, wherein
the determining whether or not the image is formed of an erasable material includes determining whether or not a color indicated by the Lab signal is a predetermined color with respect to each of the pixels, and
the image is determined to be formed of the erasable material if the number of pixels of which color are the predetermined color is equal to or more than a predetermined number.

12. The method according to claim 11, wherein
the image is determined to be formed of the non-erasable material if the number of pixels of which color are not the predetermined color is equal to or more than a predetermined number.

13. The method according to claim 8, further comprising:
erasing the image formed on the sheet by heating the image while the sheet is being pressed.

14. An image processing apparatus, comprising:
a reading unit configured to read an image formed on a sheet; and
a controller configured to determine whether or not the image on the sheet as read by the reading unit is formed of an erasable material and prevent a sheet that is determined to have an image formed of the non-erasable material from being conveyed to an erasing unit of an image erasing apparatus, wherein
the reading unit includes an image sensor formed of a plurality of pixels, the image sensor configured to generate a plurality of RGB signals corresponding to the image on the sheet, each of the RGB signals corresponding to one of the pixels, and
the controller is configured to convert each of the RGB signals to a Lab signal and determine whether or not the image on the sheet as read by the reading unit is formed of the erasable material based on the converted Lab signals.

15. The image processing apparatus according to claim 14, wherein
the controller is configured to cause the sheet that is determined to have an image formed of the erasable material to be conveyed to the erasing unit.

16. The image erasing apparatus according to claim 14, further comprising:
a first storing unit; and
a second storing unit, wherein
the controller is configured to cause the sheet that is determined to have an image formed of the erasable material to be conveyed to the first storing unit after the first sheet has passed the erasing unit, and cause the sheet that is determined to have the image formed of the non-erasable material to be conveyed to the second storing unit.

17. The image processing apparatus according to claim 14, wherein
the controller is configured to determine whether or not the image on the sheet as read by the reading unit is formed of the erasable material based on a color of the image.

18. The image processing apparatus according to claim 14, wherein
the controller is configured to determine whether or not a color indicated by the Lab signal is a predetermined color with respect to each of the pixels, and determine that the image on the sheet as read by the reading unit is formed of the erasable material if the number of pixels of which color are the predetermined color is equal to or more than a predetermined number.

* * * * *